(12) United States Patent
Rai

(10) Patent No.: US 8,145,517 B2
(45) Date of Patent: Mar. 27, 2012

(54) METHODS AND SYSTEMS FOR SCHEDULING JOB SETS IN A PRODUCTION ENVIRONMENT

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1216 days.

(21) Appl. No.: 11/779,512

(22) Filed: Jul. 18, 2007

(65) Prior Publication Data

US 2009/0025003 A1 Jan. 22, 2009

(51) Int. Cl.
*G06Q 10/00* (2006.01)
(52) U.S. Cl. ........................................ 705/7.12
(58) Field of Classification Search .............. 705/7.12
See application file for complete search history.

(56) References Cited

U.S. PATENT DOCUMENTS

| | | | |
|---|---|---|---|
| 4,821,029 A | 4/1989 | Logan et al. | |
| 5,095,369 A | 3/1992 | Ortiz et al. | |
| 5,287,194 A * | 2/1994 | Lobiondo | 358/296 |
| 5,513,126 A | 4/1996 | Harkins et al. | |
| 5,559,933 A | 9/1996 | Boswell | |
| 6,223,205 B1 | 4/2001 | Harchol-Balter et al. | |
| 6,509,974 B1 | 1/2003 | Hansen | |
| 6,546,364 B1 | 4/2003 | Smirnov et al. | |
| 6,573,910 B1 | 6/2003 | Duke et al. | |
| 6,583,852 B2 * | 6/2003 | Baum et al. | 355/40 |
| 6,631,305 B2 | 10/2003 | Newmark | |
| 6,633,821 B2 | 10/2003 | Jackson et al. | |
| 6,687,018 B1 * | 2/2004 | Leong et al. | 358/1.15 |
| 6,762,851 B1 | 7/2004 | Lynch et al. | |
| 6,763,519 B1 * | 7/2004 | McColl et al. | 718/100 |
| 6,805,502 B2 | 10/2004 | Rai et al. | |
| 6,925,431 B1 | 8/2005 | Papaefstathiou | |
| 6,961,732 B2 | 11/2005 | Hellemann et al. | |
| 6,993,400 B2 | 1/2006 | Viassolo | |
| 7,016,061 B1 | 3/2006 | Hewitt | |
| 7,051,328 B2 | 5/2006 | Rai et al. | |
| 7,061,636 B2 | 6/2006 | Ryan et al. | |

(Continued)

FOREIGN PATENT DOCUMENTS

CA 2503427 A1 10/2005

(Continued)

OTHER PUBLICATIONS

Harchol-Balter, "On Choosing a Task Assignment Policy for a Distributed Server System", IEEE Journal of Parallel and Distributed Computing, 1999, pp. 204-228.

(Continued)

*Primary Examiner* — Johnna Loftis
(74) *Attorney, Agent, or Firm* — Pepper Hamilton LLP

(57) ABSTRACT

A system of scheduling a plurality of print jobs in a document production environment may include resources and a computer-readable storage medium including programming instructions for performing a method of processing print jobs. The method may include receiving print jobs and setup characteristics corresponding to each print job. Each print job may have a corresponding job size. The print jobs may be grouped into sets based on a common characteristic and each set may be identified as a fast job set or a slow job set based on setup characteristics associated with the set and the job sizes of the print jobs in the set. The fast job set may be routed to a fast job autonomous cell and the slow job set may be routed to a slow job autonomous cell.

20 Claims, 6 Drawing Sheets

U.S. PATENT DOCUMENTS

| | | | |
|---|---|---|---|
| 7,065,567 B1 | 6/2006 | Squires et al. | |
| 7,079,266 B1 | 7/2006 | Rai et al. | |
| 7,092,922 B2 | 8/2006 | Meng et al. | |
| 7,092,963 B2 | 8/2006 | Ryan et al. | |
| 7,099,037 B2 | 8/2006 | Clark et al. | |
| 7,125,179 B1 | 10/2006 | Rai et al. | |
| 7,148,985 B2 | 12/2006 | Christodoulou et al. | |
| 7,152,589 B2 | 12/2006 | Ekeroth et al. | |
| 7,161,699 B2 | 1/2007 | Matoba | |
| 7,161,705 B2* | 1/2007 | Klassen | 358/1.18 |
| 7,200,505 B2 | 4/2007 | Shan | |
| 7,206,087 B2 | 4/2007 | Ryan et al. | |
| 7,382,484 B2 | 6/2008 | Matsukubo et al. | |
| 7,408,658 B2 | 8/2008 | Twede | |
| 7,523,048 B1 | 4/2009 | Dvorak | |
| 7,548,335 B2 | 6/2009 | Lawrence et al. | |
| 7,562,062 B2 | 7/2009 | Ladde et al. | |
| 7,567,360 B2* | 7/2009 | Takahashi et al. | 358/1.15 |
| 7,576,874 B2 | 8/2009 | Farrell et al. | |
| 7,584,116 B2 | 9/2009 | Kakouros et al. | |
| 7,590,937 B2 | 9/2009 | Jacobus et al. | |
| 7,684,066 B2* | 3/2010 | Shirai | 358/1.14 |
| 7,689,694 B2 | 3/2010 | Kato et al. | |
| 7,761,336 B1 | 7/2010 | Blankenship et al. | |
| 7,872,769 B2* | 1/2011 | Akashi et al. | 358/1.15 |
| 7,949,740 B2 | 5/2011 | Scrafford et al. | |
| 8,004,702 B2* | 8/2011 | Noda | 358/1.15 |
| 2001/0055123 A1 | 12/2001 | Ryan et al. | |
| 2002/0016803 A1 | 2/2002 | Ryan et al. | |
| 2002/0054344 A1 | 5/2002 | Tateyama | |
| 2002/0057455 A1* | 5/2002 | Gotoh et al. | 358/1.15 |
| 2002/0071134 A1 | 6/2002 | Jackson et al. | |
| 2002/0129081 A1 | 9/2002 | Rai | |
| 2002/0174093 A1 | 11/2002 | Casati et al. | |
| 2002/0198794 A1 | 12/2002 | Williams et al. | |
| 2003/0079160 A1 | 4/2003 | McGee et al. | |
| 2003/0098991 A1 | 5/2003 | Laverty et al. | |
| 2003/0105661 A1 | 6/2003 | Matsuzaki et al. | |
| 2003/0121431 A1 | 7/2003 | Ohno | |
| 2003/0149747 A1 | 8/2003 | Rai et al. | |
| 2003/0200252 A1 | 10/2003 | Krum | |
| 2003/0202204 A1 | 10/2003 | Terrill et al. | |
| 2004/0135838 A1 | 7/2004 | Owen et al. | |
| 2004/0136025 A1 | 7/2004 | Moriyama et al. | |
| 2004/0239992 A1 | 12/2004 | Kawai et al. | |
| 2004/0268349 A1 | 12/2004 | Ramakrishnan et al. | |
| 2005/0060650 A1 | 3/2005 | Ryan et al. | |
| 2005/0065830 A1 | 3/2005 | Duke et al. | |
| 2005/0068562 A1 | 3/2005 | Ferlitsch | |
| 2005/0096770 A1 | 5/2005 | Chua et al. | |
| 2005/0114829 A1 | 5/2005 | Robin et al. | |
| 2005/0134886 A1 | 6/2005 | Farrell et al. | |
| 2005/0151993 A1 | 7/2005 | Gartstein et al. | |
| 2005/0154625 A1 | 7/2005 | Chua et al. | |
| 2005/0275875 A1 | 12/2005 | Jennings, Jr. | |
| 2006/0031585 A1 | 2/2006 | Nielsen et al. | |
| 2006/0132512 A1 | 6/2006 | Walmsley et al. | |
| 2006/0149755 A1 | 7/2006 | Marshall et al. | |
| 2006/0224440 A1 | 10/2006 | Rai | |
| 2006/0226980 A1 | 10/2006 | Rai et al. | |
| 2007/0008580 A1 | 1/2007 | Tanaka | |
| 2007/0019228 A1 | 1/2007 | Rai et al. | |
| 2007/0070379 A1 | 3/2007 | Rai et al. | |
| 2007/0078585 A1 | 4/2007 | Pomeroy et al. | |
| 2007/0091355 A1 | 4/2007 | Rai | |
| 2007/0092323 A1 | 4/2007 | Lin et al. | |
| 2007/0124182 A1 | 5/2007 | Rai | |
| 2007/0177191 A1 | 8/2007 | Eschbach et al. | |
| 2007/0236724 A1 | 10/2007 | Rai et al. | |
| 2007/0247657 A1 | 10/2007 | Zhang et al. | |
| 2007/0247659 A1 | 10/2007 | Zhang et al. | |
| 2007/0279675 A1 | 12/2007 | Quach et al. | |
| 2007/0293981 A1 | 12/2007 | Rai | |
| 2008/0013109 A1 | 1/2008 | Chen et al. | |
| 2008/0201182 A1 | 8/2008 | Schneider et al. | |
| 2008/0239368 A1 | 10/2008 | Ota | |
| 2008/0256541 A1 | 10/2008 | Rai | |
| 2009/0094094 A1 | 4/2009 | Rai et al. | |
| 2009/0313061 A1 | 12/2009 | Rai et al. | |
| 2009/0313063 A1 | 12/2009 | Rai | |
| 2009/0327033 A1 | 12/2009 | Rai et al. | |

FOREIGN PATENT DOCUMENTS

| | | |
|---|---|---|
| EP | 1630663 A2 | 3/2006 |
| EP | 1705556 A1 | 9/2006 |

OTHER PUBLICATIONS

Dueck, et al., "Threshold Accepting: A General Purpose Optimization Algorithm Appearing Superior to Simulated Annealing", Journal of Computational Physics vol. 90, Issue 1, Sep. 1990, pp. 161-175, Academic Press, Inc.

Rai, et al., "A Lean Document Production Controller for Printshop Management", Proceedings of the $42^{nd}$ IEEE Conference on Decision and Control, Maui, Hawaii, Dec. 2003.

Zheng et al., "Finding Optimal (s,S) Policies is About as Simple as Evaluating a Single Policy", Operations Research, vol. 39, No. 4, (Jul.-Aug. 1991), pp. 654-665.

Bo Hu, "An Application of Inventory Models in Printing Industry", Ph.D. Candidate in Operations Management, The Simon School of Business, University of Rochester, Jul. 2007.

Veinott, Jr., et al., "Computing Optimal (s,S) Inventory Policies", Management Science, vol. 11, No. 5, Series A., Sciences, Mar. 1965, pp. 525-552.

Simchi Levi, et al. "Designing & Managing the Supply Chain: Concepts, Strategies, and Cases", Second Edition, 2000, McGraw-Hill Higher Education, New York, New York.

Cleveland et al., "STL: A Seasonal-Trend Decomposition Procedure Based on Loess", Journal of Official Statistics, vol. 16, No. 1, 1990, pp. 3-33, Sweden.

Veinott, Jr., "Optimal Policy in a Dynamic, Single Product, Nonstationary Inventory Model with Several Demand Classes", Mar. 16, 1965, Operations Research, vol. 13, No. 5, Sep.-Oct. 1965, pp. 761-778.

Faraway, "Extending the Linear Model with R: Generalized Linear, Mixed Effects and Nonparametric Regression Models" 2006, Chapman & Hall/CRC, Boca Raton, Florida.

Creo, "UpFront White Paper", www.creo.com, May 2003, 14 pages.

Mason, Dennis E., "Workflow: Defining Print's Future", www.printandgraphicsmag.com/edit_pages/0803/lead.html, Apr. 7, 2005, 3 pages.

Lesh, et al., "Improving Big Plans", Computer Science Department, University of Rochester, 8 pages.

Wellman, Michael P., "Fundamental Concepts of Qualitative Probabilistic Networks", WRDC/TXI, 58 pages, Wright-Patterson AFB, OH.

Mohammed, et al., "Planmine: Sequence Mining for Plan Failures", Computer Science Department, University of Rochester, Rochester, NY, 5 pages.

Wil Van Der Aist et al., "Workflow Mining: Discovering Process Models from Event Logs", IEEE Transactions on Knowledge and Data Engineering, vol. 16, No. 9, Sep. 2004, 14 pages.

Mohammed, J. Zaki, et al., "PlanMine: Predicting Plan Failures Using Sequence Mining", The University of Rochester Computer Science Department Technical Report 671, Jul. 1998, 22 pages.

Nebel, et al., "Plan Reuse versus Plan Generation: A Theoretical and Empirical Analysis", to appear in Artificial Intelligence (Special Issue on Planning and Scheduling), Mar. 9, 1995, 21 pages.

Marco, Dorigo, et al., "The Ant System: Optimization by a Colony of cooperating agents" IEEE Transacations of Systems, Man and Cybernetics—Part B, vol. 26, No. 1, 1996, pp. 1-26.

Doerner, Karl, et al., "Ant Colony Optimization in Multiobjective Portfolio Selection", $4^{th}$ Metaheuristics International Conference, Porto, Portugal, Jul. 16-20, 2001, pp. 243-248.

* cited by examiner

| JOB | FORM TYPE | INSERT TYPE |
|---|---|---|
| J1 | A | 1 |
| J2 | B | 1 |
| J3 | A | 3 |
| J4 | C | 2 |
| J5 | B | 2 |
| J6 | A | 1 |
| J7 | A | 3 |
| J8 | C | 2 |
| J9 | B | 2 |
| J10 | C | 1 |

FIG. 2

| JOB | JOB SIZE | FORM TYPE | INSERT TYPE |
|---|---|---|---|
| J1 | 107 | A | 1 |
| J2 | 310 | C | 2 |
| J3 | 87 | B | 2 |
| J4 | 565 | B | 1 |
| J5 | 131 | A | 2 |

| JOB | JOB SIZE | FORM TYPE | INSERT TYPE |
|---|---|---|---|
| J1 | 292 | A | 1 |
| J2 | 64 | A | 2 |
| J3 | 122 | B | 1 |
| J4 | 80 | A | 2 |
| J5 | 442 | A | 1 |

| JOB | WORK-IN-PROGRESS LEVEL (IN PAGES) | POSITION IN SEQUENCE |
|---|---|---|
| A1 | 750 | 2 |
| A2 | 1,500 | 3 |
| A3 | 4,300 | 1 |
| A4 | 500 | 5 |
| A5 | 920 | 4 |

METHODS AND SYSTEMS FOR SCHEDULING JOB SETS IN A PRODUCTION ENVIRONMENT

REFERENCE TO RELATED APPLICATIONS

This application is related to U.S. patent application Ser. Nos. 11/11/779,464; 11/779,494; 11/779,392; 11/779,418; 11/779,437; and 11/779,454 and 10/946,756 filed Sep. 22, 2004.

BACKGROUND

The disclosed embodiments relate generally to a method for scheduling and routing jobs, such as print Jobs, in a manufacturing or production environment.

Manufacturing and production processes produce results by receiving sets of instructions and materials required to create or modify an item, such as a document, a vehicle, a computing device or another item. Often, the processes must permit some customization or alteration of individual items based on customer desires. For example, although an automobile production line may be configured to produce a particular make and model of car, the individual cars produced may have different specifications, such as leather or cloth seating, standard or premium wheels, exterior paint color and other specifications of type. As another example, document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

Scheduling architectures that organize print jobs arriving at a document production environment and route the print jobs to autonomous cells are known in the art and are described in, for example, U.S. Pat. No. 7,051,328 to Rai et al. and U.S. Pat. No. 7,065,567 to Squires et al., the disclosures of which are incorporated by reference in their entirety.

Production environments can receive high volume jobs. In addition, there can be significant variability associated with the jobs due to multiple types of setup characteristics associated with each job. As such, the known scheduling architecture may be inefficient in processing high volume, highly variable jobs.

Transaction print environments that process jobs having a heavy-tailed job-size distribution tend to have inefficient job flows. This is because these environments typically handle very large and very small jobs that are all part of one job pool. It is likely that several small jobs may be delayed if they are queued behind a very large job. Similarly, large jobs can experience flow interruptions if several small jobs requiring multiple setups are ahead of the large jobs in the queue.

SUMMARY

Before the present methods are described, it is to be understood that this invention is not limited to the particular systems, methodologies or protocols described, as these may very. It also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific term used herein have the same meanings as commonly understood by one of ordinary skill in the art. As used herein, the term "comprising" means "including, but not limited to."

In an embodiment, a system of scheduling a plurality of print jobs in a document production environment may include a plurality of print job processing resources and a computer-readable storage medium comprising one or more programming instructions for performing a method of processing a plurality of print jobs in a document production environment. The method may include receiving a plurality of print jobs and at least one setup characteristic corresponding to each print job. Each print job may have a corresponding job size. The plurality of print jobs may be grouped into one or more print job sets based on a common characteristic and each print job set may be identified as a fast job set or a slow job set based on one or more setup characteristics associated with the print job set and the job sizes of the print jobs in the print job set. The fast job set may be routed to a fast job autonomous cell comprising one or more first print job processing resources for processing the fast job set. The slow job set may be routed to a slow job autonomous comprising one or more second print job processing resources for processing the slow Job set.

In an embodiments a system of scheduling a plurality of jobs in a production environment may include a plurality of resources and a computer-readable storage medium including one or more programming instructions for performing a method of processing a plurality of jobs in a production environment. The method may include receiving a plurality of jobs and at least one setup characteristic corresponding to each job. Each job may have a corresponding job size. The plurality of jobs may be grouped into one or more job sets based on a common characteristic and each job set may be identified as a fast job set or a slow job set based on one or more setup characteristics associated with the job set and the job sizes of the jobs in the job set. The fast job set may be routed to a fast job autonomous cell comprising one or more first resources for processing the fast job sets and the slow job set may be routed to a slow job autonomous cell comprising one or more second resources for processing the slow job set.

In an embodiment, a computer-implemented method of processing a plurality of print jobs in a document production environment may include receiving a plurality of print jobs and at least one setup characteristic corresponding to each print job. Each print job may have a corresponding job size. The plurality of print jobs may be grouped into one or more print job sets based on a common characteristic and each print job set may be identified as a fast job set or a slow job set based on one or more setup characteristics associated with the print job set and the job sizes of the print jobs in the print job set. The fast job set may be routed to a fast job autonomous cell comprising one or more first print job processing resources for processing the fast job set. The slow job set may be routed to a slow job autonomous cell comprising one or more second print job processing resources for processing the slow job set.

In an embodiment, a computer-implemented method of processing a plurality of jobs in a production environment may include receiving a plurality of jobs and at least one setup characteristic corresponding to each Job. Each job may have a corresponding job size. The plurality of jobs may be grouped into one or more job sets based on a common characteristic and each job set may be identified as a fast job set or a slow job set based on one or more setup characteristics associated with the job set and the job sizes of the jobs in the job set. The fast job set may be routed to a fast job autonomous cell comprising one or more first resources for processing the fast job set, and the slow job set may be routed to a slow job autonomous cell comprising one or more second resources for processing the slow job set.

DESCRIPTION OF THE DRAWINGS

FIG. 2 depicts an exemplary plurality of jobs and corresponding form types and insert types according to an embodiment.

FIG. 3 depicts an exemplary set of jobs according to an embodiment.

FIG. 4 depicts an exemplary set of jobs according to an embodiment.

DETAILED DESCRIPTION

For purposes of the discussion below, a "production environment" or "production process" refers to an entity having multiple items of equipment to manufacture and/or process items that may be customized based on customer requirements. For example, a vehicle production environment may exist in an automobile assembly plant, where different areas exist to assemble and/or finish portions of the automobile such as the engine, trim, drive train, and other parts. A document production environment includes document production resources, such as printers, cutters, collators and the like. A chemical, pharmaceutical or other process industry production environment may include production resources such as chemical processing units, vessels, heating equipment, mixing equipment and the like. A production environment may be a free standing entity, including one or more production-related devices, or it may be part of a corporation or other entity. Additionally, the production environment may communicate with one or more servers by way of a local area network or a wide area network, such as the Internet or the World Wide Web.

A "job" refers to a logical unit of work that is to be completed for a customer. A job may include one or more jobs from one or more clients. A production system may include a plurality of jobs. Although the disclosed embodiments pertain to document production systems, the disclosed methods and systems can be applied to production systems in general.

A "print job" refers to a job processed in a document production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

Figure 1:
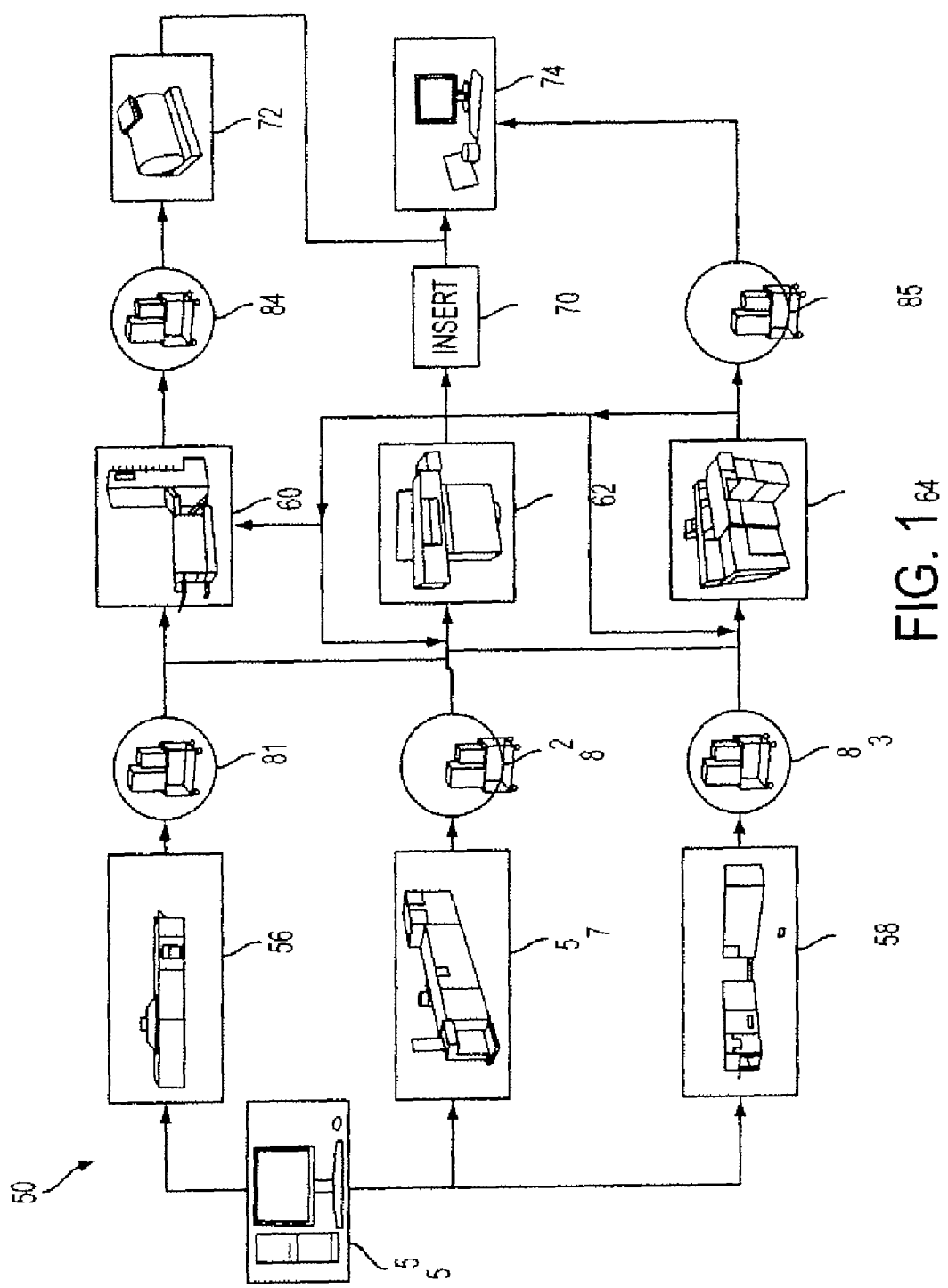
FIG. 1 illustrates an exemplary print shop production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Jobs may have different processing requirements. For example, incoming jobs may have variable job sizes, setup requirements, processing frequency and the like. An autonomous cell refers to a group of resources used to process jobs. An autonomous cell may include the resources needed to complete at least one job. A resource may be a device configured to process one or more jobs. For example, in a document production environment, if the job requires printing, cutting and collating, an autonomous cell for processing the job may include at least one printer, one cutter and one collator. In a chemical production environment, an autonomous cell may include production resources necessary to convert a plurality of raw materials into one or more complete chemical outputs.

In an embodiment, jobs may be partitioned into one or more job sets based on a common characteristic, such as originating from the same client or the like. Each job in the set may have a corresponding job size and one or more corresponding setup characteristics. A setup characteristic may include a feature of any step in the production process. For example, in a document production system, the printer setup may be dependent on the type of form used. In an automobile production environment, setup characteristics may result from customer selections of trim design, exterior paint color, interior color, seating type and/or other features. In a computer system production environment, setup characteristics may result from customer selections of hard drive capacity, random access memory capacity, processing speed, operating systems and/or other features. In a chemical production environment, setup characteristics may be associated with cleaning and preparing production resources to process a next chemical product type. For example, a setup characteristic may include the time required to clean a production resource before it can be used to process another chemical product.

In an embodiment, each setup characteristic may be associated with one or more types. For example, in a document production environment, a form type setup characteristic may be associated with three types of forms: form A, form B and form C. Similarly, a job may be associated with two setup characteristics, such as form type and insert type. As illustrated by FIG. 2, ten jobs, jobs J1-J10 200 may be associated with a form type setup characteristic 205 and an insert type characteristic 210. For example, job J1 215 may be associated with form type A and insert type 1.

In an embodiment, one or more metrics may be determined for each job set based on the job sizes and setup characteristics associated with the jobs in the job set. For example, if a job set has two corresponding setup characteristics, such as form type and insert type, the set may be associated with two metrics, one corresponding to each setup characteristic. FIG. 3 illustrates a set of jobs 300 and corresponding job sizes 305, form type setup characteristics 310 and insert type setup characteristics 315. In an embodiment, a job set size may be determined by summing the sizes of the jobs in the job set. A first metric may be determined by determining a ratio of the job set size to the number of distinct form types associated with the jobs in the set. For example, a first metric for the set of jobs 300 illustrated in FIG. 3 may be determined by summing the job sizes of jobs J1-J5 (i.e., 1,200) and dividing this value by the number of distinct form types associated with jobs J1-J5 (i.e., 3). As such, the first metric for the set equals 400.

A second metric may be determined by determining a ratio of the sum of the sizes of the jobs in the set to the number of distinct insert types associated with the jobs in the set. For example, a second metric for the set of jobs 300 illustrated in FIG. 3 may be determined by summing the job sizes of jobs J1-J5 (i.e., 1,200) and dividing this value by the number of distinct insert types associated with jobs J1-J5 (i.e., 2). As such the second metric for the set equals 600.

In an embodiment, the number of metrics associated with a job set may correspond to the number of setup characteristics of the jobs in the set. For example, if a set of jobs has five corresponding setup characteristics, the set may be associated with five metrics.

In an embodiment, each metric may be compared to a corresponding metric threshold value. A metric threshold value may represent the ratio of job set size to number of setup characteristic types that may be necessary to optimize job flow. A metric threshold value may be determined using a simulation model, such as a model based on discrete event simulation, to simulate and optimize the workflow A simulation-based approach may be used to determine an optimal ratio for each setup characteristic by using manual iteration until an improved solution is obtained. Alternatively, formal optimization techniques may be used. If formal optimization techniques are used, the threshold parameters may be specified as variables and a performance measure, such as the total number of late jobs, total production cost or the like, of the overall print shop may be used as an objective function to be optimized. Constraint functions may also be specified in addition to constraints on variables. Threshold parameters may then be determined via an optimization of the simulation model. Several techniques, such as mixed-integer programming, simulated annealing, genetic programs and the like can be used to perform the optimization that may include discrete and continuous decision variables.

In an embodiment, a set of jobs may be categorized based on a comparison between its metrics and the corresponding metric threshold values. In an embodiment, a job set having one or more metrics that exceed the corresponding metric threshold value may be identified as a fast job set or the like. For example, referring back to FIG. 3, if the metric threshold value associated with the form type metric is 300 and the metric threshold value associated with the insert type metric is 700, the job set may be identified as a fast job set. A fast job set may include jobs that have low setup requirements when compared to the metric thresholds associated with the setup requirements. For example, a fast job set may include print jobs with similar setup requirements which may ease transitioning from one job to the next.

In an embodiment, if all the metrics associated with a job set do not exceed the metric threshold values associated with the setup requirements, the job set may be identified as a slow job set or the like. A slow job set may include jobs that have high setup requirements when compared to the metric thresholds associated with the setup requirements. For example, a slow job set may include several small to mid-sized jobs with substantially different setup requirements which may cause significant delays in transitioning from one job to the next.

FIG. 4 illustrates categorizing a job set 400, J1-J5, in this manner. As illustrated in FIG. 4, the job set 400 utilizes two form types (i.e., form type A and form type B) and two insert types (i.e., insert type 1 and insert type 2). The sum of the sizes of the jobs in the set is 1,000. If the metric threshold value corresponding to the form type setup characteristic is 520, and the metric threshold value corresponding to the insert type setup characteristic is 505, then the job set 400 may be identified as a slow job set because its form type metric value (i.e., 1000/2=500) and its insert type metric value (i.e., 1,000/2=500) do not exceed the corresponding metric threshold values (i.e., 520 and 505, respectively). If the metric threshold value corresponding to the form type setup characteristic is 450, however, the set may be identified as a fast job set because its form type metric value (i.e., 500) exceeds the corresponding metric threshold value (i.e., 450).

In an alternate embodiment, a job set may be categorized based on different metric threshold conditions. For example, a job set may be identified as a slow job set if the metric associated with form type does not exceed the corresponding metric threshold value. Alternatively, a job set may be identified as a slow job set if the metric associated with insert type does not exceed the corresponding metric threshold value. Additional and/or alternate methodologies may be used within the scope of this disclosure.

In an embodiment, jobs in a set may be arranged prior to being processed. For example, jobs may be sequenced according to a first-in-first-out ("FIFO") policy, an earliest due date ("EDD") policy or the like.

A FIFO policy may arrange jobs based on the order in which they were received. For example, a job set may contain three jobs, J1-J3. If J2 is received first, J1 is received second and J3 is received third, the job set may be processed in the following order: J2, J1, J3.

An EDD policy may arrange jobs based on the order in which they are due. For example, a job set may contain three jobs, J1-J3. If J3 is due first, J1 is due second and J2 is due last, then the subgroup may be processed in the following order: J3, J1, J2.

In an embodiment, a job set may be routed to one or more autonomous cells using a least work-in-progress policy a round robin policy, a random policy, a size interval task assignment with equal load ("SITA-E") policy or the like.

Figure 8:
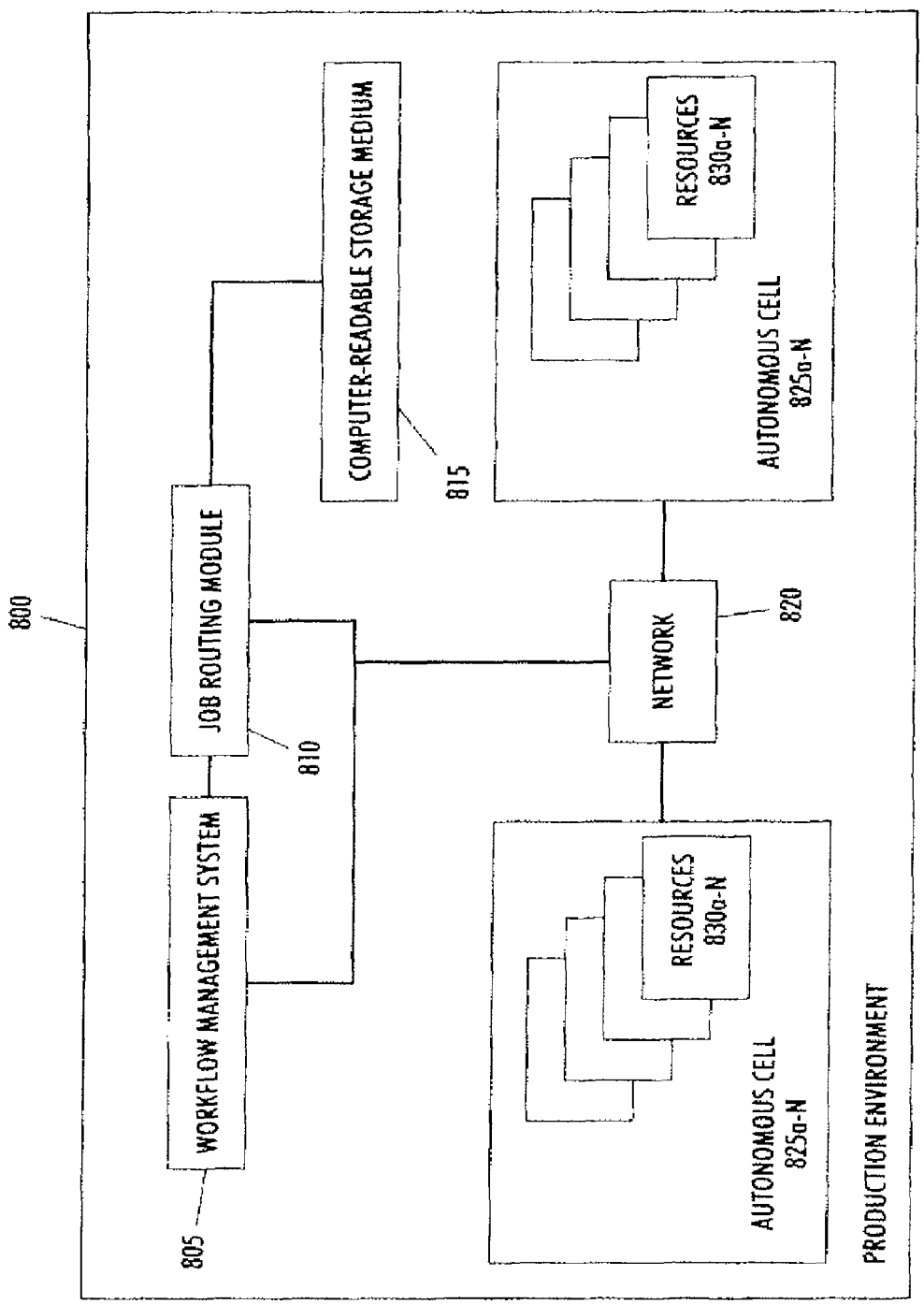
FIG. 8 depicts an exemplary environment suitable for processing a plurality of jobs according to an embodiment.

A least work-in-progress policy may determine a volume of work within each autonomous cell and may route job sets to the autonomous cell with the smallest work volume. For example, as illustrated by FIG. 8, autonomous cell A4 520 has the lowest volume of all autonomous cells, A1-A5 500, so using a least work-in-progress policy, a job may be routed to autonomous cell A4 520.

Figures 5, 6:
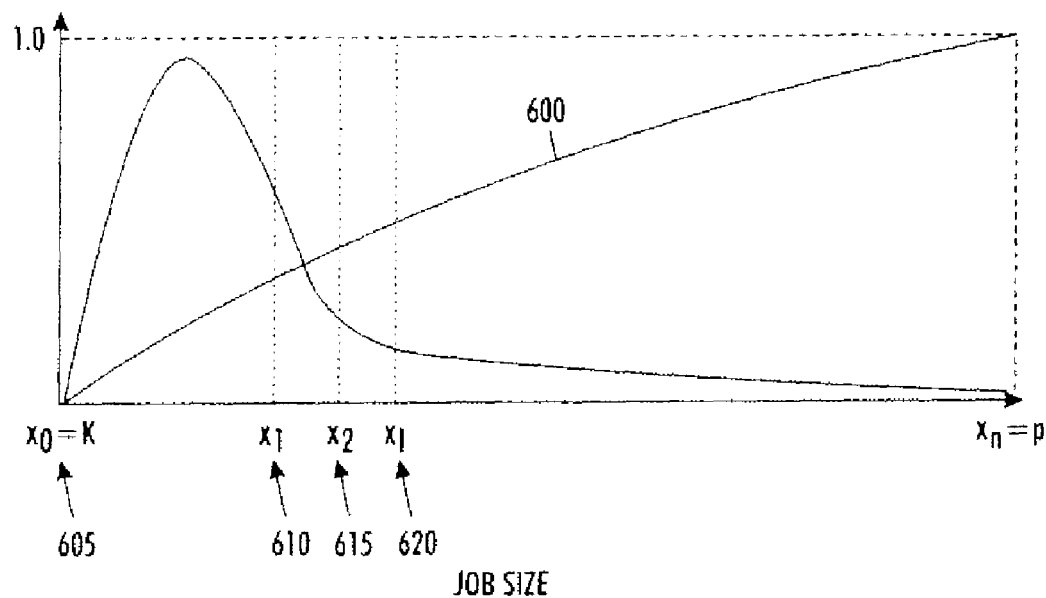
FIG. 5 depicts an exemplary plurality of autonomous cells and corresponding utilization percentages and positions in a sequence according to an embodiment.
FIG. 6 depicts an exemplary graph of a job size distribution and size internals using the SITA-E routing policy according to an embodiment.

A round robin policy may route a job set to an autonomous cell in a particular order. For example, autonomous cells may receive job sets sequentially or in a specified order. The round robin policy may route a job set to the autonomous cell which is next in the order. As illustrated by FIG. 5, autonomous cells A1-A5 500 may receive job sets in a specified sequence based on each cell's position in the sequence, namely: A3 515, A1 505, A2 510, A5 525, A4 520. As such, if autonomous cell A2 510 received the last job set, autonomous cell A5 525 may receive the next job set using a round robin policy.

A random policy may randomly route job sets to an autonomous cell. For example, referring to FIG. 5, any one of the autonomous cells A1-A5 500 may have an equal probability of receiving a job set.

A SITA-E policy may route job sets to an autonomous cell tasked with processing job sets of similar sizes. For example, each autonomous cell may be assigned a separate range of job sizes so that the total load each autonomous cell receives is roughly the same. In an embodiment, a job size distribution appearing to have heavy-tailed characteristics may be modeled using a bounded Pareto distribution such that:

$$f(x) = \frac{\alpha k^u x^{(-\alpha-1)}}{(1 - (k/p)^\alpha)}$$
$$k \leq x \leq p$$

Variable k may represent the smallest job size in the distribution, variable p may represent the largest job size in the distribution and $\alpha$ may represent the index of stability that may be determined through fitting the distribution. The job size distribution may then be divided into multiple segments where each segment may be represented as:

$$\int_{x_0=k}^{x_1} x\, dF(x) = \int_{x_1}^{x_2} x\, dF(x) = \ldots = \int_{x_{h-1}}^{x_h=p} x\, dF(x) = \frac{M}{h} = \frac{\int_k^p x\, dF(x)}{h}$$

$$x_t = \left(\frac{(h-i)}{h}k^{1-\alpha} + \frac{i}{h}p^{1-\alpha}\right)^{\frac{1}{1-\alpha}} \text{ if } \alpha \neq 1$$

$$x_t = k\left(\frac{p}{k}\right)^{\frac{1}{h}} \text{ if } \alpha = 1$$

$$F(x) = Pr\{X \leq x\}$$

FIG. 6 illustrates an exemplary job size cumulative density function curve and corresponding segments according to an embodiment. For example, the area under the cumulative density curve 600 between $x_0=k$ 605 and $x_1$ 610 may be substantially the same as the area under the cumulative density curve 600 between $x_1$ 610 and $x_2$ 615, between $x_2$ 615 and $x_1$ 620, and so on, where $x_1, x_2, x_1, \ldots, x_h$ represent job sizes between the smallest job size in the distribution (i.e., k) and the largest job size in the distribution (i.e., p). As such, the range of job sizes associated with jobs in a subgroup may be determined and the jobs may be routed to an autonomous cell which processes jobs of the determined size range.

Figure 7:
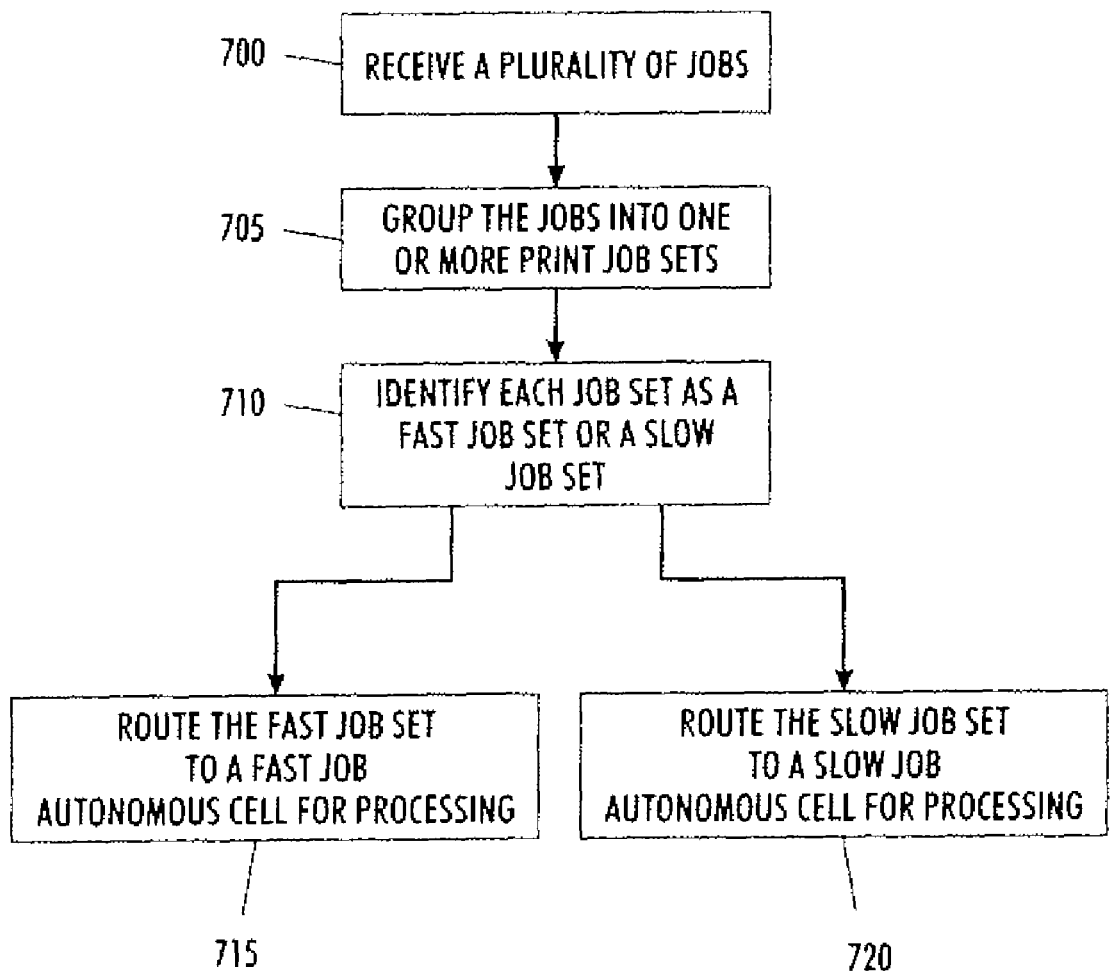
FIG. 7 depicts an exemplary flow chart of processing a plurality of jobs according to an embodiment.

FIG. 7 illustrates an exemplary flow chart of categorizing one or more job sets according to an embodiment. A plurality of jobs may be received 700 and the jobs may be grouped 705 into one or more job sets based on a common characteristics such as belonging to the same client. Each job set may be identified 710 as a fast job set or a slow job set based on the sizes of the jobs in the set and the number and type of setup characteristics associated with the jobs. A fast job set may be routed 715 to a fast job autonomous cell for processing. A slow job set may be routed 720 to a slow job autonomous cell for processing.

FIG. 8 depicts an environment suitable for practicing the illustrative embodiments. The production environment 800 may include a workflow management system 805 that is responsible for managing workflow in the production environment 800, a job routing module 810 that is responsible for routing jobs to resources and/or autonomous cells and a computer-readable storage medium 815. The production environment 800 may also include resources 830a-N such as a printer, a copier, a binder, a hole-punch, a collator, a sealer or any other equipment used to process jobs. The resources may be grouped into autonomous cells 825a-N such that each autonomous cell 825a-N includes one or more resources 830a-N necessary to process at least one job. The workflow management system 805 may be implemented on a stand-alone computer system or may be integrated into the resources. The workflow management system 805 may also be implemented by distributed components such as separate electronic devices. A network 820 may interconnect the resources 830a-N with the workflow management system 805, as illustrated in FIG. 8. The network 820 may include a local area network (LAN) or a wide area network (WAN) such as the Internet, the World Wide Web or the like. The network 820 may also be formed by communication links that interconnect the workflow management system 805 and the resources 830a-N. Alternatively, the disclosed embodiments may be practiced in environments where there is no network connection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system of scheduling a plurality of print jobs in a document production environment, the system comprising:
   a plurality of print job processing devices;
   a computing device; and
   a computer-readable storage medium in communication with the computing device, wherein the computer-readable storage medium comprises one or more programming instructions that, when executed, cause the computing device to:
      receive a plurality of print jobs and at least one setup characteristic corresponding to each print job, wherein each print job has a corresponding job size,
      group the plurality of print jobs into one or more print job sets based on a common characteristic,
      identify each print job set as a fast job set or a slow job set based on one or more setup characteristics associated with the print job set and the job sizes of the print jobs in the print job set, wherein the fast job set comprises print jobs having similar setup characteristics, wherein the slow job set comprises print jobs having substantially different setup characteristics,
      route the fast job set to a fast job autonomous cell comprising one or more first print job processing devices for processing the fast job set, and
      route the slow job set to a slow job autonomous cell comprising one or more second print job processing devices for processing the slow job set.

2. The system of claim 1, wherein the one or more programming instructions that, when executed, cause the computing device to identify each print job set comprise one or more programming instructions that, when executed, cause the computing device to:
   identify the one or more setup characteristics associated with the print job set, wherein each setup characteristic has one or more associated types;
   for each setup characteristic associated with the print job set, determine a corresponding metric;
   if each metric associated with the print job set does not exceed a corresponding metric threshold value, identify the print job set as a slow job set; and if one or more metrics associated with the print job set exceeds the corresponding metric threshold value, identify the print job set as a fast job set.

3. The system of claim 2, wherein the one or more programming instructions that, when executed, cause the computing device to for determine a corresponding metric comprise one or more programming instructions that, when executed, cause the computing device to:
   determine a job set size by summing the job sizes associated with the print jobs in the print job set;
   determine a number of types associated with the setup characteristic; and
   divide the job set size by the number of associated types.

4. The system of claim 1, wherein the one or more programming instructions that, when executed, cause the computing device to identify each print job set comprise one or more programming instructions that, when executed, cause the computing device to:
   arrange the print jobs in the print job set based on an order in which each print job was received.

5. The system of claim 1, wherein the one or more programming instructions that, when executed, cause the computing device to identify each print job set comprise one or more programming instructions that, when executed, cause the computing device to:
   arrange the print jobs in the print job set based on a due date of each print job.

6. The system of claim 1, wherein the one or more programming instructions that, when executed, cause the computing device to route the fast job set comprise one or more programming instructions that, when executed, cause the computing device to:
   use a routing policy selected from a random policy, a round-robin policy, a least work-in-progress policy and a size interval task assignment with equal load policy.

7. The system of claim 1 wherein the one or more programming instructions that, when executed, cause the computing device to route the slow job set comprise one or more programming instructions that, when executed, cause the computing device to:
   determine a work-in-progress level for each slow job autonomous cell, wherein the work-in-progress level represents a level of print work that is being processed in the slow job autonomous cell at a specified time; and
   route the slow job set to the slow job autonomous cell with the smallest work-in-progress level.

8. The system of claim 1, wherein the one or more programming instructions that, when executed, cause the computing device to route the slow job set comprise one or more programming instructions that, when executed, cause the computing device to perform one or more of the following:
   use a round-robin policy to route the slow job set to a slow job autonomous cell;
   randomly route the slow job set to a slow job autonomous cell; and
   determine a range of job sizes for the print jobs in the slow job set and routing the slow job set to a slow job autonomous cell wherein the slow job autonomous cell processes the determined range of job sizes.

9. A system of scheduling a plurality of jobs in a production environment, the system comprising:
   a plurality of devices;
   a computing device;
   a computer-readable storage medium in communication with the computing device, wherein the computer-readable storage medium comprises one or more programming instructions that, when executed, cause the computing device to:
   receive a plurality of jobs and at least one setup characteristic corresponding to each job, wherein each job has a corresponding job size,
   group the plurality of jobs into one or more job sets based on a common characteristic,
   identify each job set as a fast job set or a slow job set by:
       identify the one or more setup characteristics associated with the job set, wherein each setup characteristic has one or more associated types,
       for each setup characteristic associated with the job set, determine a corresponding metric,
       if each metric associated with the job set does not exceed a corresponding metric threshold value, identify the job set as a slow job set, and
       if one or more metrics associated with the job set exceeds the corresponding metric threshold value, identify the job set as a fast job set,
   route the fast job set to a fast job autonomous cell comprising one or more first devices for processing the fast job set, and
   route the slow job set to a slow job autonomous comprising one or more second devices for processing the slow job set.

10. The system of claim 9, wherein the one or more programming instructions that, when executed, cause the computing device to determine a corresponding metric comprise one or more programming instructions that, when executed, cause the computing device to:
   determine a job set size by summing the job sizes associated with the jobs in the job set;
   determine a number of types associated with the setup characteristic; and
   divide the job set size by the number of associated types.

11. A computer-implemented method of processing a plurality of print jobs in a document production environment, the method comprising:
   receiving a plurality of print jobs and at least one setup characteristic corresponding to each print job, wherein each print job has a corresponding job size;
   grouping, by a computing device, the plurality of print jobs into one or more print job sets based on a common characteristic;
   identifying, by the computing device, each print job set as a fast job set or a slow job set based on one or more setup characteristics associated with the print job set and the job sizes of the print jobs in the print job set, wherein the fast job set comprises print jobs having similar setup characteristics, wherein the slow job set comprises print jobs having substantially different setup characteristics;
   routing, by the computing device, the fast job set to a fast job autonomous cell comprising one or more first print job processing resources for processing the fast job set; and
   routing, by the computing device, the slow job set to a slow job autonomous comprising one or more second print job processing resources for processing the slow job set.

12. The method of claim 11, wherein identifying each print job set comprises:
   identifying the one or more setup characteristics associated with the print job set, wherein each setup characteristic has one or more associated types;
   for each setup characteristic associated with the print job set, determining a corresponding metric;

if each metric associated with the print job set does not exceed a corresponding metric threshold value, identifying the print job set as a slow job set; and if one or more metrics associated with the print job set exceeds the corresponding metric threshold value, identifying the print job set as a fast job set.

13. The method of claim 12, wherein determining a corresponding metric comprises:

determining a job set size by summing the job sizes associated with the print jobs in the print job set;

determining a number of types associated with the setup characteristic; and dividing the job set size by the number of associated types.

14. The method of claim 11, wherein identifying each print job set comprises:

arranging the print jobs in the print job set based on an order in which each print job was received.

15. The method of claim 11, wherein identifying each print job set comprises:

arranging the print jobs in the print job set based on a due date of each print job.

16. The method of claim 11, wherein routing the fast job set comprises:

using a routing policy selected from a random policy, a round-robin policy, a least work-in-progress policy and a size interval task assignment with equal load policy.

17. The method of claim 11, wherein routing the slow job set comprises:

determining a work-in-progress level for each slow job autonomous cell, wherein the work-in-progress level represents a level of print work that is being processed in the slow job autonomous cell at a specified time; and routing the slow job set to the slow job autonomous cell with the smallest work-in-progress level.

18. The method of claim 11, wherein routing the slow job set comprises any of the following:

using a round-robin policy to route the slow job set to a slow job autonomous cell;

randomly routing the slow job set to a slow job autonomous cell; or determining a range of job sizes for the print jobs in the slow job set and routing the slow job set to a slow job autonomous cell, wherein the slow job autonomous cell processes the determined range of job sizes.

19. A computer-implemented method of processing a plurality of jobs in a production environment, the method comprising:

receiving a plurality of jobs and at least one setup characteristic corresponding to each job, wherein each job has a corresponding job size;

grouping, by a computing device, the plurality of jobs into one or more job sets based on a common characteristic;

identifying, by the computing device, each job set as a fast job set or a slow job set by:

identifying the one or more setup characteristics associated with the job set, wherein each setup characteristic has one or more associated types, for each setup characteristic associated with the job set, determining a corresponding metric, if each metric associated with the job set does not exceed a corresponding metric threshold value, identifying the job set as a slow job set, and if one or more metrics associated with the job set exceeds the corresponding metric threshold value, identifying the job set as a fast job set;

routing, by the computing device, the fast job set to a fast job autonomous cell comprising one or more first resources for processing the fast job set; and routing, by the computing device, the slow job set to a slow job autonomous comprising one or more second resources for processing the slow job set.

20. The method of claim 19, wherein the one or more programming instructions for determining a corresponding metric comprises one or more programming instructions for:

determining a job set size by summing the job sizes associated with the jobs in the job set;

determining a number of types associated with the setup characteristic; and dividing the job set size by the number of associated types.

* * * * *